(12) United States Patent
Nagae (10) Patent No.: US 6,663,300 B2
(45) Date of Patent: Dec. 16, 2003

(54) CAMERA (75) Inventor: Ryuichi Nagae, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/234,678

(22) Filed: Sep. 4, 2002

(65) Prior Publication Data

US 2003/0049031 A1 Mar. 13, 2003

(30) Foreign Application Priority Data

Sep. 7, 2001 (JP) ........................................ 2001-272511

(51) Int. Cl.⁷ .............................................. G03B 17/00
(52) U.S. Cl. ...................................... 396/448; 359/511
(58) Field of Search ................................ 396/348, 349, 396/448; 359/511

(56) References Cited

U.S. PATENT DOCUMENTS

| | | | | |
|---|---|---|---|---|
| 4,721,972 A | * | 1/1988 | Wakabayashi | 396/349 |
| 5,486,889 A | * | 1/1996 | Shintani | 396/448 |
| 5,602,607 A | * | 2/1997 | Kato et al. | 396/349 |
| 5,646,790 A | * | 7/1997 | Kohmoto et al. | 359/823 |
| 5,970,260 A | * | 10/1999 | Nakayama et al. | 396/80 |
| 6,419,407 B1 | * | 7/2002 | Nakazawa | 396/448 |
| 6,443,634 B1 | * | 9/2002 | Tsuboi | 396/448 |
| 6,469,840 B2 | * | 10/2002 | Nomura et al. | 359/699 |

* cited by examiner

*Primary Examiner*—Russell Adams
*Assistant Examiner*—Michael Dalakis
(74) *Attorney, Agent, or Firm*—Robin, Blecker & Daley (57) ABSTRACT

The invention provides a camera including a hold barrel member which holds an image-taking optical unit; a barrier member, disposed on a subject side of the hold barrel member, which opens or closes a substantially rectangular opening; and a barrier driving member, disposed between the barrier member and the hold barrel member, which drives the barrier member in such a way as to rotate on an optical axis of the image-taking optical unit. In a state in which the barrier member opens the opening, the hold barrel member forms a long side part of the opening, and the barrier driving member forms a short side part of the opening.

6 Claims, 7 Drawing Sheets

CAMERA

BACKGROUND OF THE INVENTION

1. Field of the Invention

This invention relates to a camera having a lens barrier mechanism for covering the front of a lens and thereby protecting the lens.

2. Description of the Related Art

In an optical apparatus, especially in a silver-film camera or a digital camera that can be used as a portable camera, a lens barrier mechanism is provided at the front end of a lens barrel, in order to prevent an image-taking lens from being dirtied or scratched when no image-taking is performed (for example, when a power source is in OFF state).

Recently, demands to reduce the size of cameras have been made, and, in order to meet this demand, an attempt has been made to reduce the size of a lens barrel that holds an image-taking lens, in addition to the size reduction of a camera. Accordingly, it is necessary to reduce the size of a lens barrier mechanism mounted in the lens barrel.

Additionally, in order to possess superior product advantages, it is necessary not only to reduce the size of the camera but also to reduce manufacturing costs, and therefore it is also necessary to achieve cost reductions of the lens barrier mechanism mounted in the lens barrel as well as the size reduction thereof. As a result, various techniques have been developed to satisfy the aforementioned demands.

In Japanese Laid-Open No. H7-5545, the present applicant proposes a camera lens barrier mechanism suitable for an oblong screen. This lens barrier mechanism has an opening lengthened in a lateral direction, a rotary barrier plate that is rotated by 90 degrees on a lens optical axis when a barrier is closed, and a pair of upper and lower barrier blades that can rise and fall and can retract into a space above the upper edge of a hole of the rotary barrier plate and into a space under the lower edge of the hole thereof, respectively, when the barrier is opened.

Further, in Japanese Laid-Open No. H9-211536, there is proposed a barrier device that can prevent an increase in thickness in the direction of the optical axis of a barrier device body, thereby making the device compact.

This barrier device includes a barrier member for covering the front of a image-taking lens in a closed state, a driving member for opening and closing the barrier member, and an elastic member for absorbing a run out movement of the driving member with respect to the barrier member. The elastic member is incorporated into the inside of the barrier member. According to this publication, a compact lens barrier device is provided.

However, the lens barrier mechanism proposed in Japanese Laid-Open No. H7-5545 is at a disadvantage in the fact that the number of parts for driving the lens barrier mechanism increases, thereby leading to a rise in the cost of the camera.

On the other hand, in the barrier device proposed in Japanese Laid-Open No. H9-211536, the number of parts that constitute the device is small, and the thickness in the direction of the optical axis of the device body diminishes. However, since the shapes of the parts (for example, the shape of a primary barrier 1 and that of a sub-barrier 2 in this publication) are different from each other, a plurality of molds must be prepared when the parts are manufactured, and great expense for the molds and for the parts is required. As a result, to its disadvantage, the manufacturing costs of the barrier device rise.

Another problem of the barrier device disclosed in this publication is the fact that the rotational shafts of the two barriers (i.e., the primary barrier 1 and the sub-barrier 2 in this publication) are disposed near each other, and therefore a great retraction space is required when the barriers are retracted from an opening, thereby enlarging the barrier device in the radial direction.

SUMMARY OF THE INVENTION

It is therefore an object of the present invention to solve the aforementioned problems and to provide a camera capable of being made compact and capable of reducing costs.

The present invention is characterized in that a camera includes a hold barrel member which holds an image-taking optical unit; a barrier member, disposed on a subject side of the hold barrel member, which opens and closes a substantially rectangular opening; and a barrier driving member, disposed between the barrier member and the hold barrel member, which drives the barrier member in such a way so as to rotate on an optical axis of the image-taking optical unit. And the hold barrel member forms a long side part of the opening, and the barrier driving member forms a short side part of the opening in a state in which the barrier member opens the opening.

Preferably, the barrier driving member also forms a corner part of the opening.

Preferably, the camera further includes a spring, one end of which is connected to the barrier member and the other end of which is connected to the barrier driving member. The spring is disposed in a thickness in the direction of the optical axis of the barrier driving member.

Preferably, when the hold barrel member is moved into the camera body, the barrier driving member rotates on the optical axis, and the barrier driving member drives the barrier member so as to close the opening.

Preferably, when the hold barrel member is moved out from the camera body, the barrier driving member rotates on the optical axis, and the barrier driving member drives the barrier member so as to open the opening.

Preferably, the barrier member includes a pair of barrier blades that rotate on a predetermined axis disposed at the hold barrel member.

Further features and objects will become apparent from the drawings and descriptions provided below.

BRIEF DESCRIPTION OF THE DRAWINGS

FIG. 8(*a*) is an explanatory diagram of a conventional example, and FIG. 8(*b*) is an explanatory diagram of the present embodiment.

DETAILED DESCRIPTION OF THE PREFERRED EMBODIMENTS

Hereinafter, a preferred embodiment of the invention will be described in detail with reference to the drawings.

Figure 1:
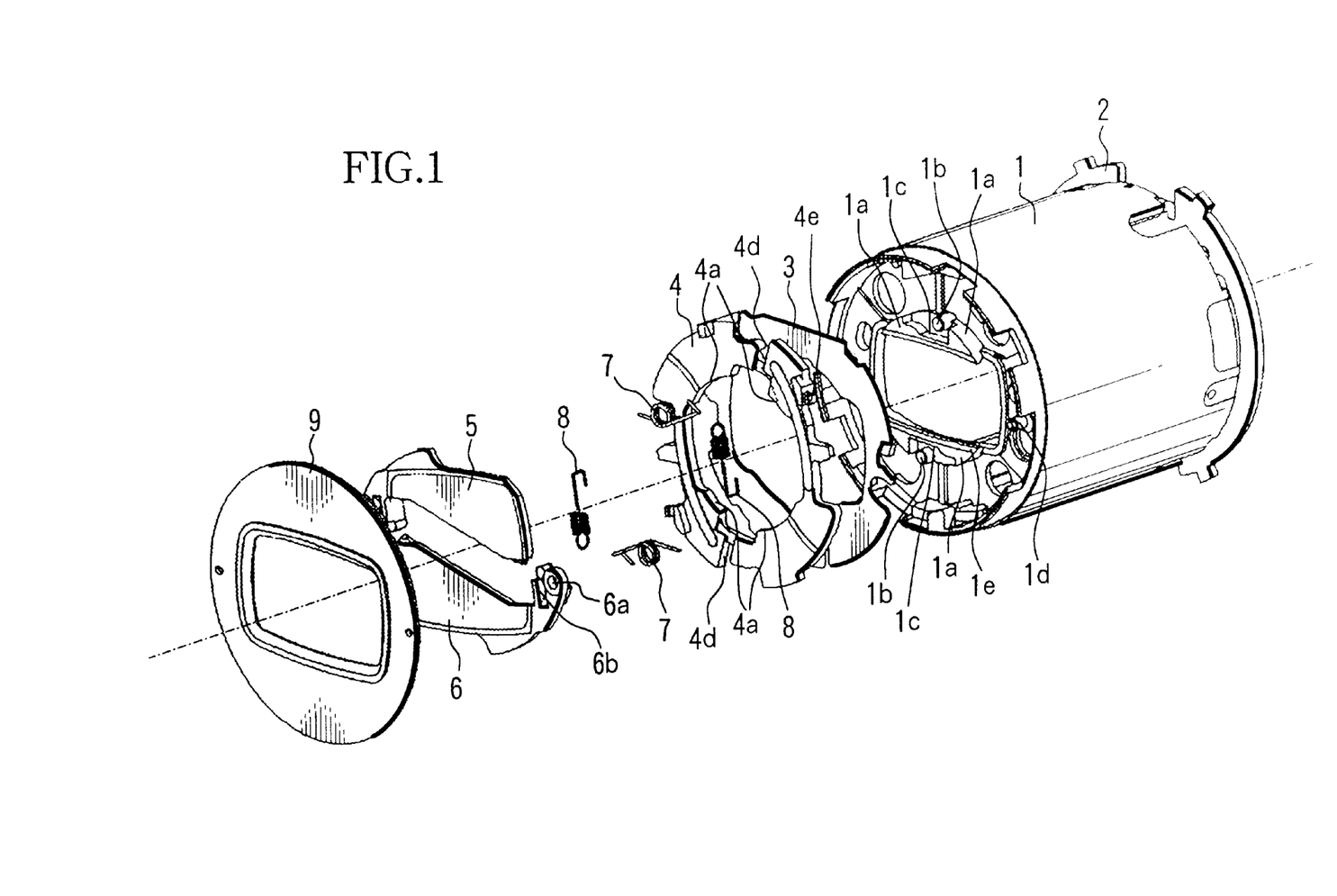
FIG. 1 is an exploded perspective view of a lens barrel provided with a lens barrier mechanism.

Referring to the attached drawings, a description will be given of a camera including a lens barrier mechanism which is an embodiment of the present invention. FIG. 1 is an exploded perspective view of a lens barrel of a camera of this embodiment.

Reference numeral 1 designates a lens barrel for holding an image-taking lens (not shown), 2 designates a straight-movement guiding member which moves the lens barrel 1 only in the direction of an optical axis, and 3 designates a sheet which prevents dust, etc., from the outside from entering the lens barrel 1.

Reference numeral 4 designates barrier driving rings which drive barrier blades described later. Reference numeral 5 designates a first barrier blade, and reference numeral 6 designates a second barrier blade. The barrier blades 5 and 6 become rotatable on shaft (axes) portions 1d provided in the lens barrel 1 by fitting holes portions 5a and 6a formed at the base ends of the respective blades 5 and 6 onto the shaft portions 1d.

Herein, the barrier driving ring 4 rotates on the optical axis in response to a movement of the lens barrel as described later, and thereby the first and second barrier blades 5 and 6 are opened or closed. The first and second barrier blades 5 and 6 are formed to have the same shape, and are disposed so that the optical axis serves as a symmetry axis.

Figure 3:
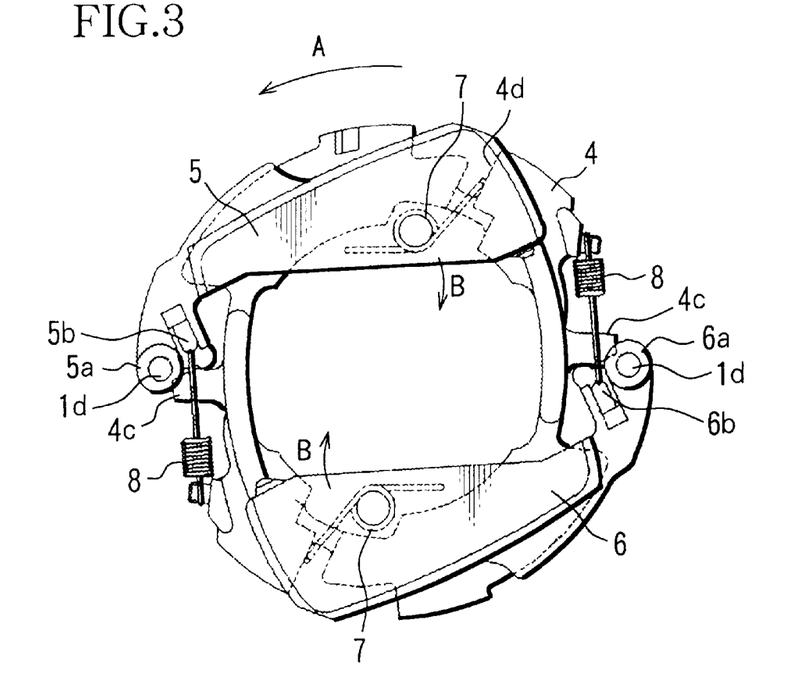
FIG. 3 is a view showing a barrier-blade closing motion.

Reference numeral 7 designates opening springs. Coiled portions of the opening springs 7 are fitted onto projection portions 1b formed on the lens barrel 1, and one end of each of the opening spring 7 is in contact with a contact surface 1c of the lens barrel 1, and, as shown in FIG. 3, the other end thereof is in contact with a contact surface 4d of the barrier driving ring 4. Accordingly, the opening springs 7 push the barrier driving ring 4 in the direction in which the barrier blades 5 and 6 are opened (i.e., clockwise direction with respect to the front of the lens barrel in FIG. 1) as described later.

Two opening spring 7 are used in this embodiment, and are disposed so that the image-taking optical axis serves as a symmetry axis. Although the two opening springs 7 are used in this embodiment, only one opening spring may be used.

Reference numeral 8 designates closing springs. Ring-shaped ends of the closing springs 8 are fitted onto projection portions 4e formed on the barrier driving ring 4, and the other ends thereof, shaped like the letter "L", are engaged with hole portions 5b and 6b formed at the base ends of the barrier blades 5 and 6. The closing springs 8 are disposed so that the image-taking optical axis serves as a symmetry axis.

Reference numeral 9 designates a cover which forms the exterior of the lens barrel, by which the barrier blades 5 and 6 are pressed against the lens barrel 1 side.

Since the driving method of the lens barrel and the operation of the camera provided with the lens barrel are well known, a detailed description of these is omitted here. Only the operation of the lens barrier mechanism will be described.

First, a description will be given of a closing motion of the barrier blades 5 and 6 in the lens barrier mechanism.

In FIG. 1, the barrier driving ring 4 is fitted onto sliding portions 1a formed in the lens barrel 1. The inner circumferential surfaces 4a of the barrier driving ring 4 are slidable on the outer circumferential surfaces of the sliding portions 1a, and therefore the barrier driving ring 4 can be smoothly rotated with respect to the lens barrel 1.

Figure 2:
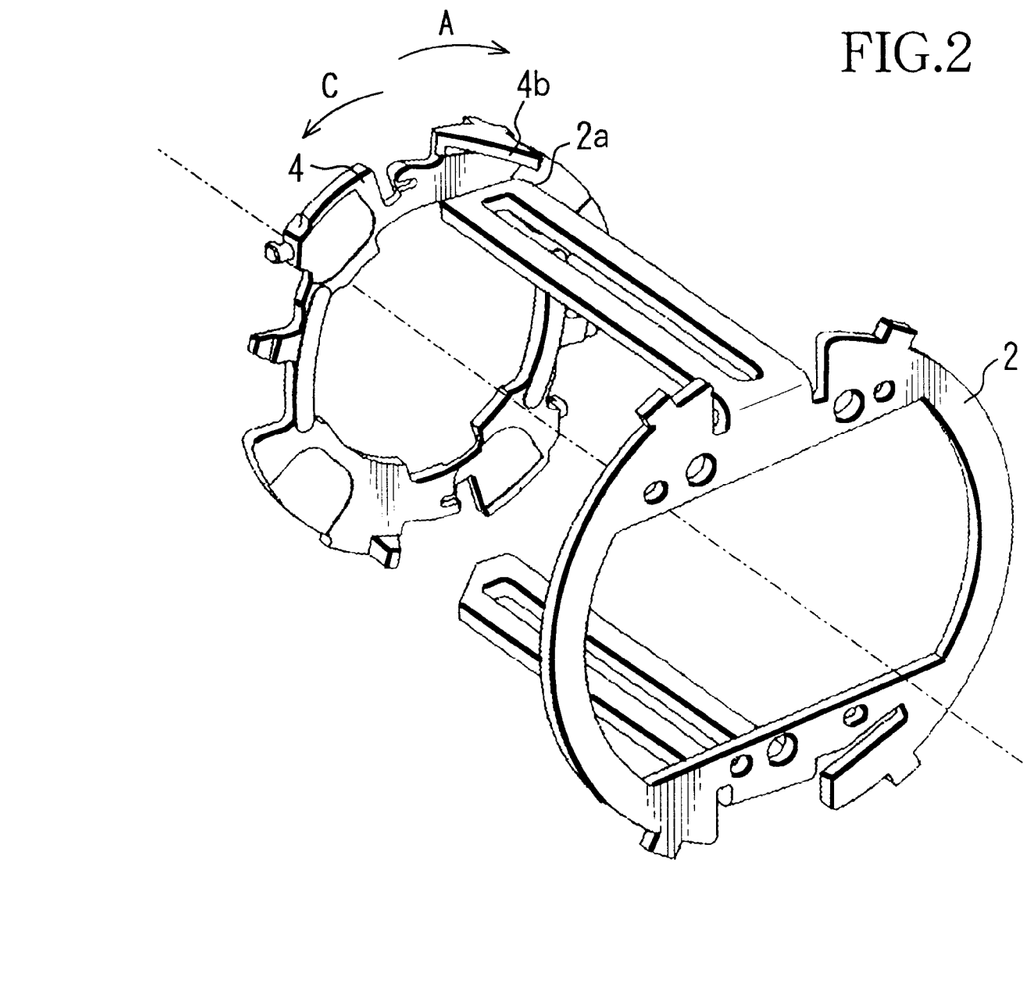
FIG. 2 is an exploded perspective view of a barrier driving ring and a straight-movement guiding member.

In FIG. 2, the barrier driving ring 4 has a cam 4b used to convert the inward and outward motion of the lens barrel will respect to the camera body into the rotational motion of the barrier driving ring 4. The straight-movement guiding member 2 has a contact portion 2a brought into contact with the cam 4b of the barrier driving ring 4.

When a power source of the camera provided with the lens barrel of this embodiment is turned off, the lens barrel 1 begins to be moved in to a predetermined collapse position in the camera body, and thereby a relative distance between the straight-movement guiding member 2 and the barrier driving ring 4 becomes short. Thereafter, when the cam 4b of the barrier driving ring 4 is brought into contact with the contact portion 2a of the straight-movement guiding member 2, the barrier driving ring 4 rotates in the direction of arrow "A" shown in FIG. 2.

As shown in FIG. 3, the barrier driving ring 4 rotates in the direction of arrow "A" while charging the opening springs 7 that are in contact with the barrier driving ring 4.

Since the barrier blades 5 and 6 are connected to the barrier driving ring 4 through the closing springs 8, the barrier blades 5 and 6 rotate in the direction of arrow "B" centering on the shaft portions id that are fitted in the hole portions 5a and 6a, respectively, in accordance with the rotation of the barrier driving ring 4 in the direction of arrow "A".

During the rotation of the barrier driving ring 4, the barrier blades 5 and 6 contact with contact portions 4c of the barrier driving ring 4. Thereby, the barrier blades 5 and 6 rotate at the speed according to the rotation speed of the barrier driving ring 4.

When the barrier driving ring 4 rotates and reaches a predetermined rotation position, the first barrier blade 5 comes into contact with the second barrier blade 6. Thereby, the barrier blades 5 and 6 cover the front surface of the lens barrel 1, thus protecting the image-taking lens disposed in the lens barrel 1.

Figure 4:
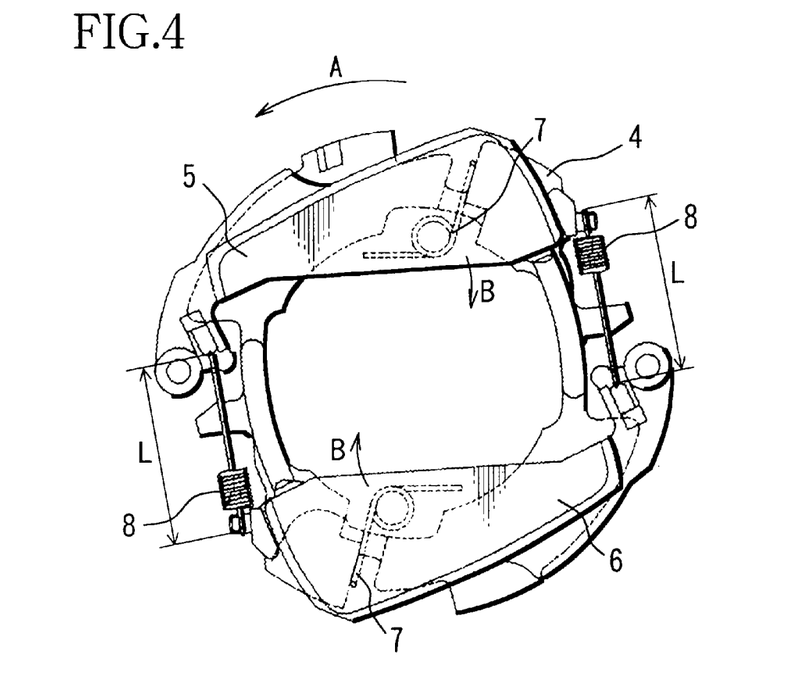
FIG. 4 is a view showing a barrier-blade closing motion (the barrier blade being restricted to close).

Next, referring to FIG. 4, a description will be given of a situation in which the rotation of the barrier blades 5 and 6 is restricted by some influence, e.g., by the fact that a user has inserted his/her finger into the moving area of the barrier blades 5 and 6 during the closing motion of the barrier blades 5 and 6.

When the rotation of the barrier blades 5 and 6 is restricted during the closing motion as mentioned above, the barrier driving ring 4 continues rotating in the direction of arrow "A" in accordance with the inward motion of the lens barrel 1, and stops at the predetermined rotation position.

On the other hand, the barrier blades 5 and 6 still remain at the motion-restricted position without rotating in the direction of arrow "B" because the barrier blades 5 and 6 are subject to restrictions on the closing motion. In this condition, the whole length L of the closing springs 8 are increased by the expansion thereof, and pulling force generated by the closing springs 8 in the direction of arrow "B" is applied onto the barrier blades 5 and 6.

When the barrier blades 5 and 6 are released from motion restrictions, the barrier blades 5 and 6 rotate in the direction of arrow "B" by the pulling force applied onto the barrier blades 5 and 6 by the closing spring 8.

Since the barrier driving ring 4 remains at the predetermined rotation position at this time, the barrier blades 5 and 6 come into contact with each other and thereby cover the front of the lens barrel 1.

Next, a description will be given of the opening motion of the barrier blades 5 and 6.

When the power source of the camera is changed from OFF to ON, the lens barrel 1 is moved out in the forward direction of the optical axis, and thereby the relative distance between the straight-movement guiding member 2 and the barrier driving ring 4 is increased. In detail, in FIG. 2, the cam 4b of the barrier driving ring 4 moves away from the contact portion 2a of the straight-movement guiding member 2.

Figure 5:
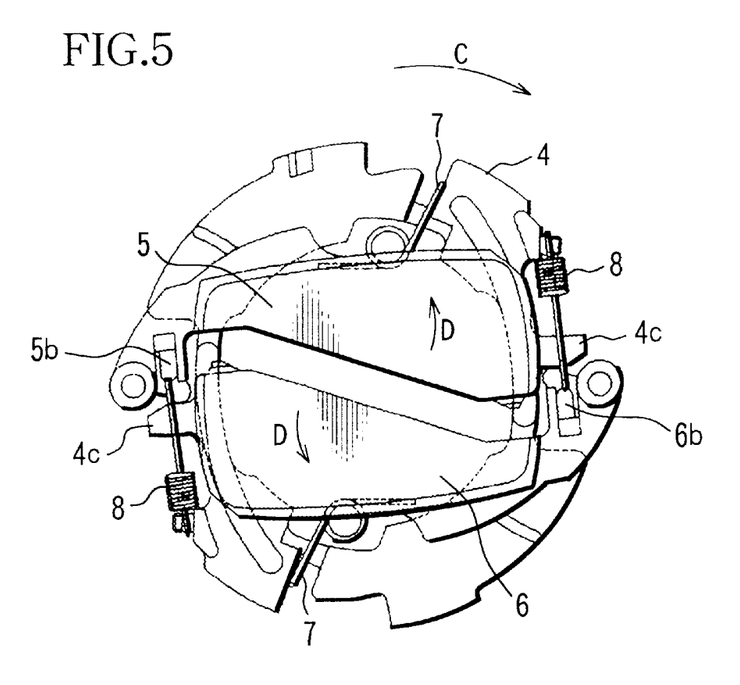
FIG. 5 is a view showing a barrier-blade opening motion.

Before the lens barrel 1 begins to move outwards in the direction of the optical axis, the barrier driving ring 4 is pushed by the opening springs 7 in the direction of arrow "C" as shown in FIG. 5. When the lens barrel 1 moves outward, the relative distance between the straight-movement guiding member 2 and the barrier driving ring 4 is increased, and the barrier driving ring 4 rotates in the direction of arrow "C" while receiving pushing force given by the opening springs 7.

When the barrier driving ring 4 rotates in the direction of arrow "C", the contact portions 4c of the barrier driving ring 4 push the barrier blades 5 and 6. Thereby, the barrier blades 5 and 6 rotate in the direction of the arrow "D" centering on the shaft portions 1d.

Figure 6:
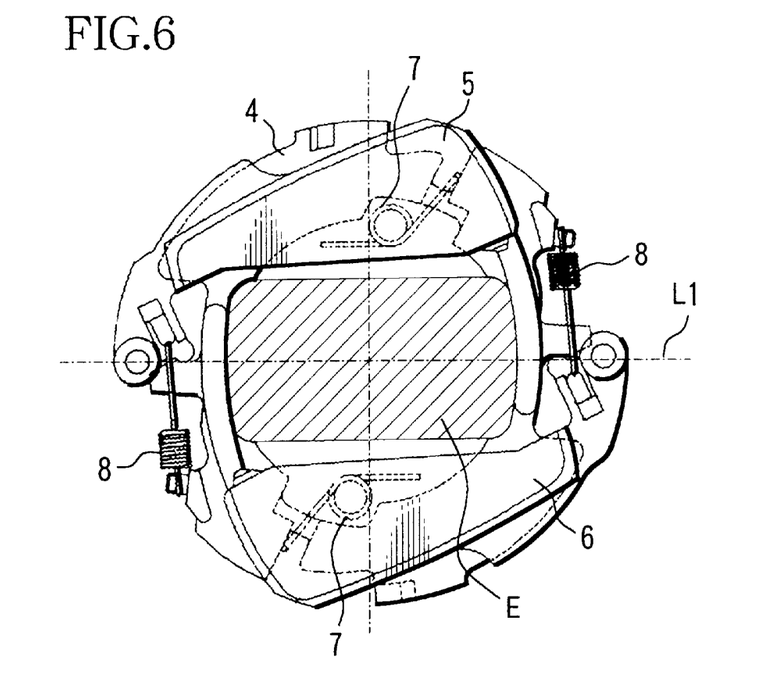
FIG. 6 is a view showing a barrier-blade opening motion (the barrier blade having completed opening).

When the barrier driving ring 4 rotates in the direction of arrow "C" and reaches the position (shown in FIG. 6) of a rotation stopper (not shown) provided in the lens barrel 1, the barrier blades 5 and 6 stop at positions sufficiently distant from an opening area E shown by the oblique lines of FIG. 6. The opening area E serves as an area through which light flux from a subject passes.

These motions make it possible to open the barrier blades 5 and 6 and perform image-taking.

Figure 7:
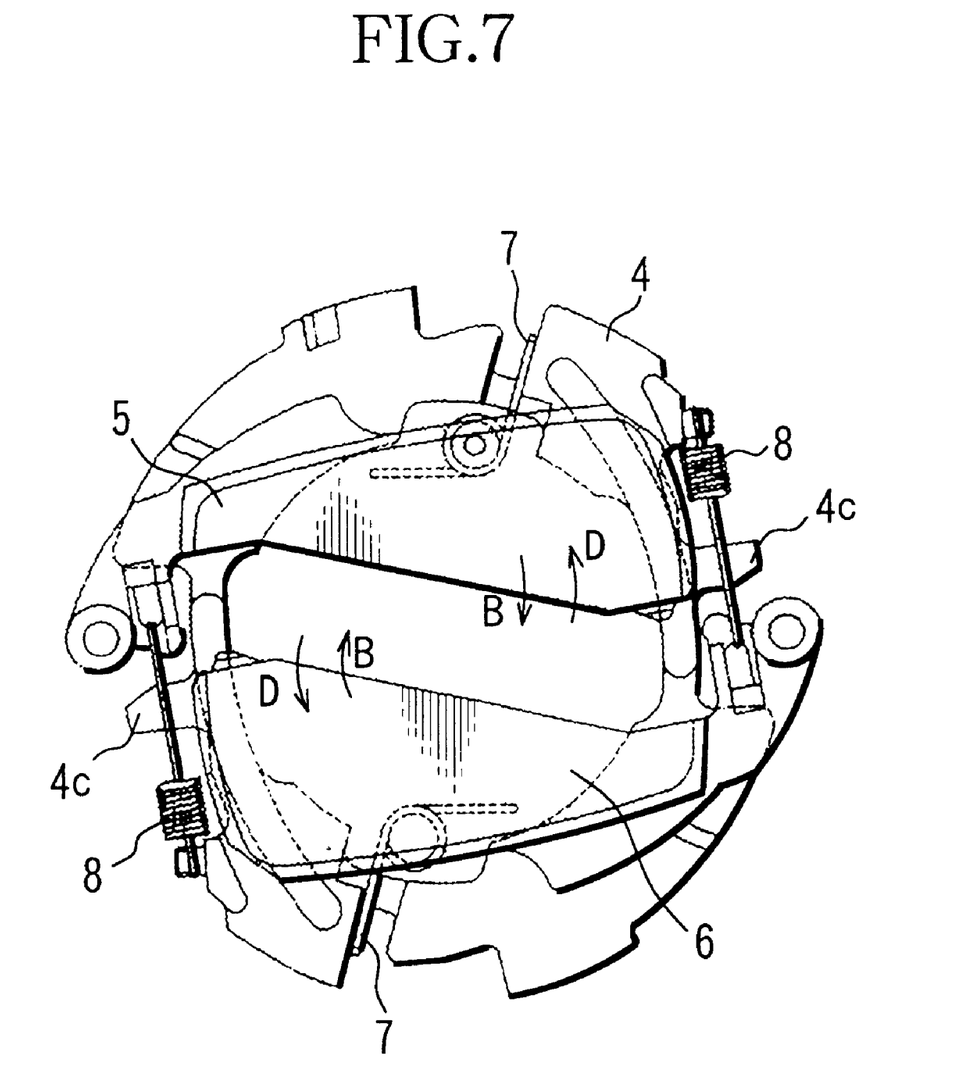
FIG. 7 is a view showing a barrier-blade opening motion (the barrier blade being restricted to open).

Next, referring to FIG. 7, a description will be given of the motion caused when the barrier blades 5 and 6 are opened by an action exerted from the outside, e.g., when a user forcibly opens the barrier blades 5 and 6, in a state in which the barrier blades 5 and 6 are closed.

The barrier driving ring 4 stops at the predetermined rotation position without rotating when the barrier blades 5 and 6 are closed. In this state, when the barrier blades 5 and 6 are opened by an action from the outside, the barrier blades 5 and 6 rotate in the direction of arrow "D" while the closing springs 8 connected to the barrier blades 5 and 6 are being extended. During this rotation, the pulling force in the direction of arrow "B" is applied by the pulling springs 8 onto the barrier blades 5 and 6.

At this moment, the contact portions 4c of the barrier driving ring 4 never rotates in response to the rotation of the barrier blades 5 and 6. Thereafter, when the barrier blades 5 and 6 are stopped from being opened, the barrier blades 5 and 6 rotate in the direction of arrow "B" while receiving the pulling force of the pulling springs 8, and return to the closed state.

Next, features in this embodiment of the present invention will be described with reference to FIGS. 8(a), (b) and FIG. 9. Conventionally, an opening area E shown by the oblique lines of FIG. 8(a) through which light flux passes is formed only by a member provided in the lens barrel (excluding the lens barrier mechanism), i.e., only by the opening 1e, shown in FIG. 9 provided in the lens barrel 1. Therefore, the lens barrier mechanism must be disposed outside the opening area E. In other words, in order to open or close the barrier blades by use of the barrier driving ring, the barrier driving ring must be disposed outside the area enclosed by the alternate long and short dash line of "10" of FIG. 8(a).

If the lens barrier mechanism is disposed in this way, the outer diameter of the barrier driving ring becomes larger, leading to the enlargement of the lens barrier mechanism.

Figure 8:
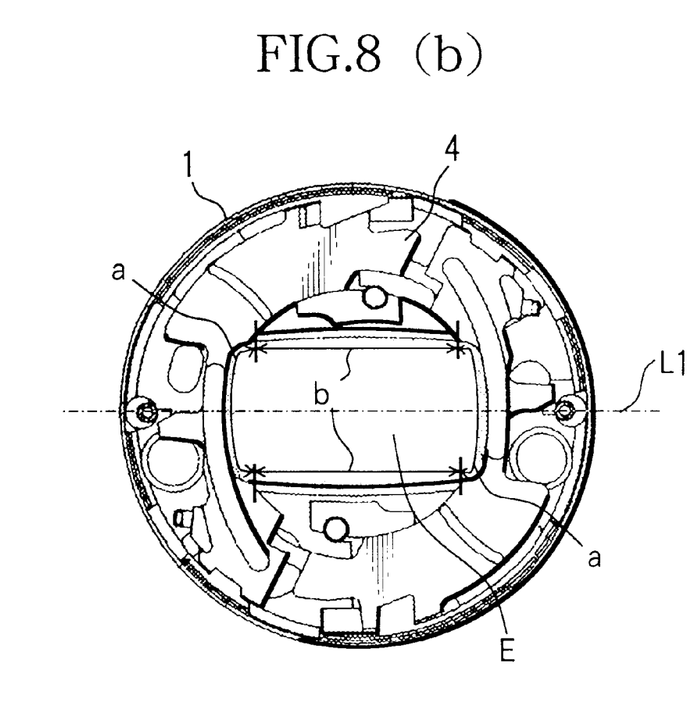
Figure 9:
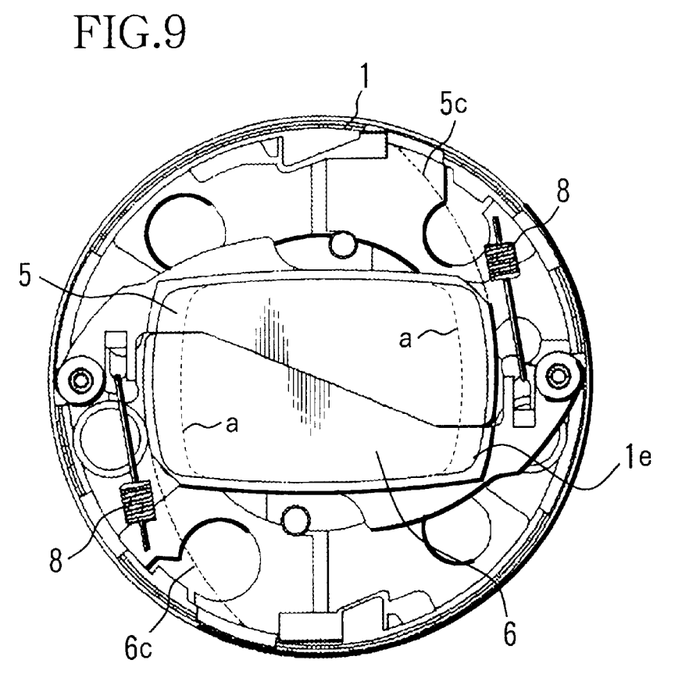
FIG. 9 is a view showing the disposition of a closing spring (front view of a lens barrier mechanism).

Therefore, in this embodiment, the opening area E through which light flux passes is formed by the opening 1e provided in the lens barrel 1 and the barrier driving ring 4 as shown in FIG. 8(b). That is, the long side parts shown by "b" of the opening area E are formed by the upper and lower end faces, respectively, of the opening 1e, and the corner peripheral parts and the short side parts shown by "a" of the opening area E are formed by a partial area in the inner peripheral end face of the barrier driving member 4.

Since the short side parts and the corner peripheral parts of the opening area E are formed by the barrier driving ring 4 in this way, the barrier driving ring 4 can be disposed closer to the optical axis than the barrier driving ring which is disposed outside the opening area E. Therefore, the outer diameter of the barrier driving ring 4 can be reduced proportionately with the approach to the optical axis. As a result, it is also possible to reduce the size of the lens barrier mechanism in the radial direction.

In this embodiment, as shown in FIG. 8(b), the rotational axes (shaft portions 1d) of the barrier blades 5 and 6 are disposed on a line L1 perpendicular to the image-taking optical axis, and, as shown in FIG. 9, the barrier blades 5 and 6 in the closed state cross the short side parts of the opening 1e (i.e., the short side parts when the opening area E is formed as shown by the dotted line of the figure).

In the lens barrier mechanism shown in FIG. 11 through FIG. 13 of Japanese Laid-Open No. H9-211536, the rotational shaft of barrier blades (i.e., barriers 101 and 102 in this publication) is disposed upward and downward with respect to the long side parts of the opening area (i.e., opening area 103a in this publication), and, in the closed state, the barrier blades 101 and 102 cross the long side parts of the opening area 103a.

In this lens barrier mechanism, the barrier blades 101 and 102 are formed to cross the long side parts of the opening area 103a in the closed state, and therefore the barrier blades 101 and 102 are greater in blade width than the barrier blades 5 and 6 which are formed to cross the short side parts of the opening area E in the closed state as in this embodiment. Therefore, there is a need to have a wider space used to allow the barrier blades 101 and 102 to recede from the opening area 103a, and, as a result, the lens barrier mechanism is enlarged in the radial direction.

Additionally, in the lens barrier mechanism of this publication, the rotational axes of the barrier blades 101 and 102 are disposed upward and downward with respect to the long side parts of the opening area 103a, and the front ends of the barrier blades 101 and 102 in the opened state greatly protrude from the short side parts of the opening area 103a outward in the longitudinal direction, and, as a result, the lens barrier mechanism is enlarged in the radial direction.

On the other hand, in this embodiment, the position where the rotational axes (shaft portions 1d) of the barrier blades 5 and 6 are disposed and the shapes of the blades are given as described above. As a result, the width of each of the barrier blades 5 and 6 can be reduced, and the barrier blades 5 and 6 in the opened state can be efficiently disposed outside the opening area E, and, accordingly, the front ends of the barrier blades 5 and 6 can be prevented from greatly protruding from the position of the short side parts outward.

Therefore, a receding space required when the barrier blades 5 and 6 recede from the opening area can be reduced, and it is possible to achieve size reduction of the lens barrier mechanism in the radial direction as well as size reduction of the aforementioned barrier driving ring 4 in the radial direction. The lens barrier mechanism reduced in size in the radial direction can be disposed in the lens barrel reduced in size in the radial direction.

Further, in this embodiment, the closing springs 8 are disposed outside the moving area in which the barrier blades 5 and 6 are opened or closed, i.e., as shown in FIG. 9, outside the moving loci 5c and 6c of the front ends of the barrier blades 5 and 6 and inside the outer periphery of the lens barrel 1.

Thereby, the closing springs 8 can be efficiently disposed without stopping the barrier blades 5 and 6 from moving into the lens barrel.

Figure 10:
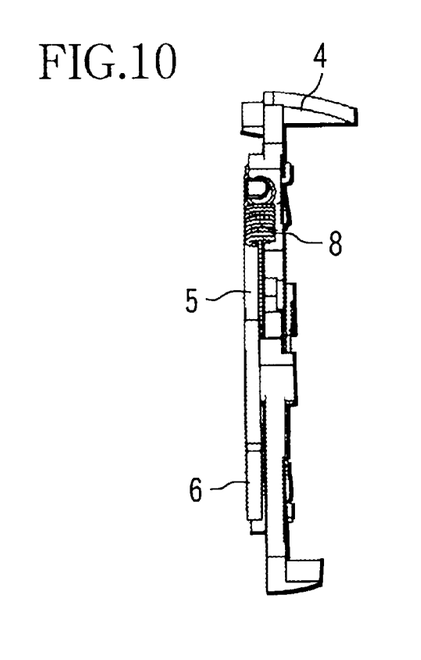
FIG. 10 is a view showing the disposition of the closing spring (side view of the lens barrier mechanism).

Further, as shown in FIG. 10, the closing springs 8 are disposed within a thickness in the direction of the optical axis between the barrier driving ring 4 and the barrier blades 5 and 6. Since the closing springs 8 are disposed in this way, it becomes unnecessary to provide spaces in the direction of the optical axis for the closing springs 8, which is independent of the space for the barrier driving ring 4 and the barrier blades 5 and 6. Therefore, the lens barrel mechanism can be made thinner.

The lens barrier mechanism of this embodiment uses members having the same shape in the barrier blades 5 and 6, in the closing springs 8, and in the opening springs 7. Therefore, in this case, molds used to manufacture the parts (for example, the barrier blades 5 and 6) can be prepared at a lower cost than in a case in which members differing in shape are used. Therefore, reductions in camera cost can be achieved.

As mentioned above, according to this embodiment, it is possible to reduce the size of the lens barrier mechanism in the radial direction and in the thickness direction, and possible to achieve reductions in camera cost.

Additionally, the lens barrier mechanism of this embodiment can obtain the following function. The opening area can be opened and closed according to the rotation of the barrier blades 5 and 6, and, even when the barrier blades 5 and 6 in the closed state are opened by an action from the outside, the barrier blades 5 and 6 can naturally return to the original closed state. The size reduction of the lens barrier mechanism never impairs a lens-barrier function.

According to the abovementioned embodiment, the short side parts and the corner peripheral parts of the opening area are formed with the barrier driving member (barrier driving ring 4), and, in this case, the outer diameter of the barrier driving member can be further reduced than in a case in which the barrier driving member is disposed outside the outer periphery of the opening area. A size reduction of the barrier driving member in the radial direction leads to a size reduction of the lens barrier mechanism.

Herein, since the closing spring to pull (or push) the barrier member (barrier blades 5,6) in the closing direction is disposed outside the opening/closing movement area of the barrier member, the closing spring can be efficiently disposed in the lens barrier mechanism without disturbing the movement of the barrier member.

Further, since the closing spring is disposed within the thickness in the direction of the optical axis of the barrier member and the barrier driving member, the lens barrier mechanism can be made thinner in the direction of the optical axis. Further, since two barrier members that are the same in shape are used, the number of molds used to manufacture the barrier members can be reduced, and, as a result, reductions in camera cost can be achieved.

In the two barrier members that are rotated and thereby opened or closed, since the two barrier members are closed while crossing the two short side parts of the opening area, the width of the barrier member can be further reduced than a situation in which the two barrier members are closed while crossing the two long side parts of the opening area.

In addition, since the rotational axis provided at the base end of the barrier member is disposed on the side of the short side part of the opening area, the barrier member in the opened state can be more efficiently disposed at the outer periphery of the opening area than in a situation in which the rotational axis is disposed in the vicinity of the long side part.

Therefore, a receding space for the barrier member in the opened state can be reduced, and it is possible to achieve a size reduction of the lens barrier mechanism in the radial direction as well as a size reduction of the outer diameter of the barrier driving member. Accordingly, the lens barrier mechanism can be mounted in a lens barrel whose size has been reduced in the radial direction.

While a preferred embodiment has been described, it is to be understood that modification and variation of the present invention may be made without departing from the sprit or scope of the following claims.

What is claimed is:

1. A camera comprising:
   a hold barrel member which holds an image-taking optical unit;
   a barrier member, disposed on a subject side of said hold barrel member, which opens or closes a substantially rectangular opening; and
   a barrier driving member, disposed between said barrier member and the hold barrel member, which drives said barrier member in such a way so as to rotate on an optical axis of said image-taking optical unit;
   wherein, in a state in which the barrier member opens said opening, the hold barrel member forms a long side part of the opening, and said barrier driving member forms a short side part of the opening.

2. The camera according to claim 1, wherein said barrier driving member also forms a corner part of said opening.

3. The camera according to claim 1, further comprising:
   a spring one end of which is connected to said barrier member and the other end of which is connected to said barrier driving member, said spring disposed in a thickness in a direction of the optical axis of said barrier driving member.

4. The camera according to claim 1, wherein, when said hold barrel member is moved into a camera body, said barrier driving member rotates on said optical axis, and the barrier driving member drives said barrier member so as to close said opening.

5. The camera according to claim 1, wherein, when said hold barrel member moves outward from a camera body, said barrier driving member rotates on said optical axis, and the barrier driving member drives said barrier member so as to open said opening.

6. The camera according to claim 1, wherein said barrier member includes a pair of barrier blades each of which rotates on a predetermined axis provided at said hold barrel member.

* * * * *

UNITED STATES PATENT AND TRADEMARK OFFICE
CERTIFICATE OF CORRECTION

| | |
|---|---|
| PATENT NO. | : 6,663,300 B2 |
| APPLICATION NO. | : 10/234678 |
| DATED | : December 16, 2003 |
| INVENTOR(S) | : Ryuichi Nagae |

It is certified that error appears in the above-identified patent and that said Letters Patent is hereby corrected as shown below:

Column 4, line 29, delete "portions id that" and insert --portions 1d that--

Signed and Sealed this

Nineteenth Day of February, 2008

JON W. DUDAS
*Director of the United States Patent and Trademark Office*